United States Patent Office 3,458,485
Patented July 29, 1969

3,458,485
HYDROXYALKYL ACRYLATE INTERPOLYMERS CROSSLINKED WITH TRIS (AZIRIDINYL) PHOSPHINE OXIDES OR SULFIDES
Richard L. Craig, Lake Jackson, Tex., assignor to The Dow Chemical Company, Midland, Mich., a corporation of Delaware
No Drawing. Filed June 27, 1966, Ser. No. 560,877
Int. Cl. C08f 27/08, 27/07
U.S. Cl. 260—79.5    7 Claims

ABSTRACT OF THE DISCLOSURE

Thermosettable resinous mixtures of (1) an interpolymer comprising styrene, vinylidene or vinyl chloride and a beta-hydroxyalkyl acrylate with (2) a tris (aziridinyl) phosphine oxide or sulfide curing agent, have such long pot life as to enable shipment in a single container while in the uncured state.

---

This invention relates to the thermosettable resins which may be cured through the use of a tris(aziridinyl) phosphine oxide or sulfide as a curing agent. More particularly it relates to a thermosettable resinous interpolymer prepared from styrene, vinylidene chloride or vinyl chloride, and a beta-hydroxyalkyl acrylate, and containing a tris(aziridinyl)phosphine oxide or sulfide curing agent, and to the compositions obtained by curing this mixture of interpolymer and curing agent.

The use of tris(aziridinyl)phosphine oxide or sulfide as curing agents in the preparation of crosslinked resins is taught in U.S. Patent 3,074,917, issued Jan. 22, 1963. Especially in the case of employing tris(aziridinyl)phosphine oxides or sulfides to crosslink a styrene based reactive copolymer such as styrene-vinylidene chloride or vinyl chloride-maleic anhydride terpolymer, the crosslinking reaction is extremely rapid. This results in a short time during which the blended resins and curing agent may be worked or used before curing takes place, i.e., one-half hour or less. This time shall be referred to hereinafter as the "pot life." Such a short pot life does not allow a sufficient amount of time in which to work with the resin for many applications before curing occurs.

The substitution of acrylic acid in equal amounts for maleic anhydride in the above resin system gives a maximum pot life of about four hours. Again, this pot life is too short for many applications, especially for the preparation of impregnated materials, i.e., cloth, paper, asbestos, and the like.

It has now been discovered that the substitution of a beta-hydroxyalkyl acrylate for the maleic anhydride or acrylic acid in the above styrene-vinylidene chloride or vinyl chloride polymer system results in a resin having a use period or pot life in the presence of tris(aziridinyl) phosphine oxides or sulfides on the order of 30 days or longer. This resin system can be readily converted to a thermoset plastic by curing at temperatures from about 275° F. to 360° F. Such a long pot life enables the resin system to be shipped in one container in a state of incomplete cure. The system has a simple composition, low toxicity, and a relatively long shelf life. High strength products can be produced by heat curing the resin composition.

Satisfactory thermosettable resinous compositions according to the present invention may contain, in chemically combined form as an interpolymer, the following amounts, expressed as percentages by weight, polymer basis, of the specified compound: from about 13 to 45 weight percent beta-hydroxyalkyl acrylate; from about 18 to 46 weight percent vinylidene chloride or vinyl chloride or mixtures thereof; and from about 20 to 65 weight percent styrene. In addition, the interpolymer may contain from about 12 to 20 weight percent acrylonitrile. To this interpolymer is added from about 6 to 20 weight percent tris(aziridinyl)phosphone oxide or sulfide.

The alkyl group of the beta-hydroxyalkyl acrylates advantageously contains from 2 to 4 carbon atoms, e.g., beta-hydroxyethyl acrylate, beta-hydroxypropyl acrylate, and beta-hydroxybutyl acrylate.

Suitable tris(azidinyl)phosphine oxides and sulfides for the practice of this invention are disclosed in U.S. Patent 3,074,917. They may be represented by the formula

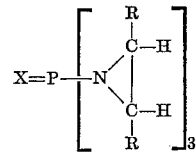

wherein R is, independently in each case, hydrogen, an alkyl, cycloalkyl, aryl, alkaryl, or arylalkyl group containing from 1 to 20 carbon atoms, and X is oxygen or sulfur. Suitable specific examples include:

tris(1-aziridinyl)phosphine oxide
tris(2-methyl-1-arizidinyl)phosphine oxide
tris(2,3-dimethyl-1-aziridinyl)phosphine oxide
tris(2-isopropyl-1-aziridinyl)phosphine oxide
tris(2-methyl-3-ethyl-1-aziridinyl)phosphine oxide
tris(2-isopropyl-1-aziridinyl)phosphine oxide
tris(2-methyl-3-n-butyl-1-aziridinyl)phosphine oxide
tris(2-hexyl-1-aziridinyl)phosphine oxide
tris(2,3-diheptyl-1-aziridinyl)phosphine oxide
tris(2-methyl-3-octyl-1-aziridinyl)phosphine oxide
tris(2-ethyl-3-decyl-1-aziridinyl)phosphine oxide
tris(2-dodecyl-1-aziridinyl)phosphine oxide
tris(2-methyl-3-tridecyl-1-aziridinyl)phosphine oxide
tris(2-ethyl-3-octadecyl-1-aziridinyl)phosphine oxide
tris(2-eicosyl-1-aziridinyl)phosphine oxide
tris(2-methyl-3-cyclopentyl-1-aziridinyl)phosphine oxide
tris(2-n-butyl-3(4-methylcyclohexyl)1-aziridinyl) phosphine oxide
tris(2-phenyl-1-aziridnyl)phosphine oxide
tris(2-phenyl-3-tetradecyl-1-aziridinyl)phosphine oxide
tris(2,3-diphenyl-1-aziridinyl)phosphine oxide
tris(2-tert.-butyl-3-phenyl-1-aziridinyl)phosphine oxide
tris(2-ethyl-3-(1-naphthyl)1-aziridinyl) phosphine oxide
tris(2-n-propyl-3-(2-naphthyl)1-aziridinyl) phosphine oxide
tris(2-methyl-3-benzyl-1-aziridinyl)phosphine oxide
tris(2-nonyl-3-benzyl-1-aziridinyl)phosphine oxide
tris(2-n-propyl-3-(2-phenylethyl)1-aziridinyl) phosphine oxide
tris(2-methyl-3-(4-methylphenyl)1-aziridinyl) phosphine oxide
tris(2-ethyl-3-(3-n-propylphenyl)1-aziridnyl) phosphine oxide
tris(2-heptyl-3-(2,4-dimethylphenyl)1-aziridinyl) phosphine oxide
tris(1-aziridinyl)phosphine sulfide
tris(2-methyl-1-aziridnyl)phosphine sulfide
tris(2,3-dimethyl-1-aziridnyl)phosphine sulfide
tris(2,3-diethyl-1-aziridinyl)phosphine sulfide
tris(2-methyl-3-isopropyl-1-aziridinyl)phosphine sulfide
tris(2-tert.-butyl-1-aziridnyl)phosphine sulfide
tris(2,3-didecyl-1-aziridnyl)phosphine sulfide tris(2-ethyl-3-pentadecyl-1-aziridinyl)phosphine sulfide
tris(2-eicosyl-1-aziridinyl)phosphine sulfide
tris(2-methyl-3-cyclohexyl-1-aziridinyl) phosphine sulfide
tris(2-phenyl-1-aziridinyl)phosphine sulfide
tris(2-phenyl-3-benzyl-1-aziridinyl)phosphine sulfide
tris(2,3-diphenyl-1-aziridinyl)phosphine sulfide
tris(2-ethyl-3-phenyl-1-aziridinyl)phosphine sulfide
tris(2-amyl-3-benzyl-1-aziridinyl)phosphine sulfide The resinous interpolymers used to prepare the thermosettable compositions of this invention may be prepared by conventional methods, e.g., heating the monomers in the relative proportions indicated in the presence of a catalytic amount of a polymerization catalyst, such as benzoyl peroxide, tert. butyl peracetate, cumene hydroperoxide, and the like. This is done in the presence of a solvent of the type conventionally used for thermosetting resins, and with which the reactants are nonreactive under the conditions of reaction used (hereinafter an inert solvent). Suitable specific examples of such solvents include methylethyl ketone, isopropyl alcohol, carbon tetrachloride, mixtures thereof, and the like. The charge of reactants, solvent, and catalyst is preferably heated at a temperature between about 75° C. and about 120° C. for a time of from about 8 to about 20 hours. Additional amounts of catalyst may be added as the reaction progresses.

The interpolymer and tris(aziridinyl)phosphine oxide or sulfide used in this invention are thoroughly mixed according to conventional procedures, e.g., by combining the materials in a roll mill or by the use of a Banbury mixer. They are preferably mixed with an additional amount of an inert solvent, such as methylethyl ketone, to assure that they dissolve completely. Before curing, the product, when isolated from the solvent, is a white to light yellow crystalline solid with a melting point of from 64° to 66° C. It is soluble in acetone and methylethyl ketone.

These interpolymer-curing agent mixtures may be completely cured by heating under moderate pressure. They may be cured at a temperature of from about 275° to 360° F., for a time of from about 15 minutes to 60 minutes, at a pressure of from about 10 to 100 p.s.i.g. The preferred curing conditions are 325° F. for 30 minutes at 25 p.s.i.g.

The resulting product is a green-to-amber-colored brittle solid which decomposes slowly at temperatures greater than 375° F. The thermoset resin is insoluble in acetone, methylethyl ketone, trichloroethylene, water, toluene, and styrene. It is unaffected by acids. A glass-reinforced resin prepared by dipping glass cloth in a methylethyl ketone solution of the uncured resin, air drying, and curing has similar properties and is stronger than the non-reinforced thermoset resin.

While the following examples illustrate representative and preferred embodiments of the invention, the scope of the invention is to be limited only by the scope of the claims appended hereto.

Example 1

The following components are placed in a vessel equipped with means for stirring: 637 grams of a terpolymer consisting of 15.6 percent by weight beta-hydroxyethyl acrylate, 20.0 percent by weight vinylidene chloride, and 64.4 percent by weight styrene, prepared according to the procedure given previously; 48 grams of tris(1-aziridinyl)phosphine oxide (7.5 weight percent, terpolymer basis); and 737 grams of methylethyl ketone solvent. The components are thoroughly mixed and used to saturate a sheet of glass cloth. The cloth is then allowed to dry in air at 25° C. for 48 hours. When dry the glass cloth saturated with partially cured resin is cut and stacked in layers of 12. A quantity of 5 samples of laminate is thus prepared and cured at temperatures of 300° F., 325° F., 335° F., 350° F. and 360° F., at a pressure of 15 p.s.i.g. between ferrotype plates for 30 minutes. The optimum cure temperature is found to be 325° F. The physical characteristics of the cured laminates thus produced are shown in Table I for the test temperatures indicated.

TABLE I

| Test temp., °F. | Flexural strength, p.s.i. | Flexural modulus, p.s.i. |
|---|---|---|
| 75 | 76,000 | $3.5 \times 10^6$ |
| 160 | 57,000 | $2.5 \times 10^6$ |
| 300 | 20,000 | $2.5 \times 10^6$ |

Flame test, ASTM D-635-56T, sec., avg. _____ 50
Barcol hardness:
   Initial _____ 62
   After trichloroethylene boil for 2 minutes _____ 58
Water gain after 24 hour soak, 25° C., percent ____ 0.2

Example 2

A resin solution is prepared as in Example 1 from the following components: 585 grams of a terpolymer comprising 19.0 percent by weight beta-hydroxyethyl acrylate, 46.0 percent by weight of vinylidene chloride, and 35 percent by weight styrene, prepared according to the procedure given previously; 45 grams of tris(1-aziridinyl)phosphine oxide (7.7 weight percent, terpolymer basis); and 606 grams of methylethyl ketone. This solution is used to prepare cured laminates of glass cloth soaked in the solution, as in Example 1. The resulting laminates have the characteristics set forth in Table II.

TABLE II

| Test temp., °F. | Flexural strength p.s.i. | Flexural modulus, p.s.i. |
|---|---|---|
| 75 | 41,000 | $3.16 \times 10^6$ |
| 160 | 5,600 | $0.47 \times 10^6$ |

Flame test, seconds _____ 5.0
Barcol hardness:
   Initial _____ 58
   After trichloroethylene boil for 2 minutes ___ 38
Water gain after 24 hours, percent _____ 0.81

Example 3

Cured resin-glass cloth laminates are prepared as in Examples 1 and 2 from a resin solution of the following components: 637 grams of a terpolymer consisting of 45 percent by weight of a beta-hydroxyethyl acrylate, 22.6 percent by weight of vinylidene chloride, and 33 percent by weight of styrene, prepared according to the procedure given previously; 143 grams of tris(1-aziridinyl)phosphine oxide (22.5 weight percent, terpolymer basis); and 780 grams of methylethyl ketone. The resulting laminates have the physical characteristics set forth in Table III.

TABLE III

| Test temp., °F. | Flexural strength p.s.i. | Flexural modulus, p.s.i. |
|---|---|---|
| 75 | 67,000 | $2.74 \times 10^6$ |
| 160 | 53,300 | $2.61 \times 10^6$ |

Flame test, seconds _____ 28.2
Barcol hardness:
   Initial _____ 58
   After trichloroethylene boil for 2 minutes __ 54
Water gain after 24 hours, percent _____ 4.77

Example 4

As above, laminates are prepared from the following resin solution: 757 grams of a terpolymer consisting of 17 percent by weight of beta-hydroxyethyl acrylate, 25 percent by weight of vinylidene chloride, and 58 percent by weight of styrene, prepared according to the procedure given previously; 58 grams of tris(1-aziridinyl)phosphine oxide (7.7 weight percent, terpolymer basis); and 885 grams of methylethyl ketone. The physical characteristics of the laminates thus produced are set forth in Table IV.

TABLE IV

| Test temp., °F. | Flexural strength p.s.i. | Flexural modulus, p.s.i. |
|---|---|---|
| 75 | 56,000 | 2.74×10⁶ |
| 160 | 21,500 | 1.44×10⁶ |

Flame test, seconds _____ 34.0
Barcol hardness:
  Initial _____ 58
  After trichloroethylene boil for 2 minutes ___ 52
Water gain after 24 hours, percent _____ 0.25

Example 5

Laminates are prepared as above from a resin solution consisting of 595 grams of a tetrapolymer consisting of 15 percent by weight of beta-hydroxyethyl acrylate, 25.5 percent by weight of vinylidene chloride, 12.5 percent by weight acrylonitrile, and 47.0 percent by weight of styrene, prepared according to the procedure given previously; 45 grams of tris(1-aziridinyl)phosphine oxide (7.6 weight percent, tetrapolymer basis); and 934 grams of methylethyl ketone. The resulting laminates have the physical characteristics set forth in Table V.

TABLE V

| Test temp., °F. | Flexural strength p.s.i. | Flexural modulus p.s.i. |
|---|---|---|
| 75 | 64,100 | 3.35×10⁶ |
| 160 | 54,600 | 2.63×10⁶ |

Flame test, seconds _____ 30
Barcol hardness:
  Initial _____ 65
  After trichloroethylene boil for 2 minutes ___ 63
Water gain after 24 hour soak, percent _____ 0.64

In each of the above Examples 1–5, the uncured resin mixture has a pot life of at least about 30 days at room temperature, i.e., about 20° C.

Example 6

An uncured resin, prepared as above, is isolated from its solution in methylethyl ketone and consists of 59.3 percent by weight of styrene, 18.9 percent by weight of vinylidene chloride, 14.5 percent by weight of betahydroxyethyl acrylate, and 17.3 percent by weight of tris(1-aziridinyl)phosphine oxide. The uncured resin is dried under vacuum at 70° C., pulverized and redried at one millimeter absolute Hg pressure and 23° C. for 48 hours. This dry resin is molded in a ⅛ x 1 x 4 inch steel mold at 250° F. under a pressure of 100 p.s.i.g.

The resulting uncured resin casting may be heated at 250° F. for as long as 2 hours without thermosetting. Thermosetting is accomplished by heating to 325° F. for 10 minutes under a pressure of 100 p.s.i.g. When thermoset, the resin would no longer mold into a new shape, even at 350° F. The thermoset resin is an extremely hard, brittle solid, which is amber in color and transparent.

Example 7

A resinous terpolymer is prepared according to the procedure given previously from a mixture consisting of 16 percent by weight beta-hydroxyethyl acrylate, 42 percent by weight vinyl chloride, and 42 percent by weight styrene, A quantity of 1200 g. of a 40% by weight solution of this terpolymer in carbon tetrachloride and acetone is mixed with 56 g. of tris(aziridinyl)phosphine oxide (11.6 percent by weight, terpolymer basis). The resulting mixture is cured by air drying at 25° C. for 20 hours, then heating at 335° F. for 30 minutes, first at atmospheric pressure for four minutes, at 20 p.s.i.g. for six minutes, and at 100 p.s.i.g. for 20 minutes.

Substitution of other tris(aziridinyl)phosphine oxides and sulfides as described by the general formula given previously and as listed previously gives similar thermoset resin products. Additionally, beta-hydroxypropyl acrylate and beta-hydroxybutyl acrylate may be substituted for the beta-hydroxyethyl acrylate with similar advantageous results.

What is claimed is:

1. A thermosettable resinous mixture which comprises from about 6 to 20 weight percent of a tris(aziridinyl)-phosphine oxide or sulfide having the formula

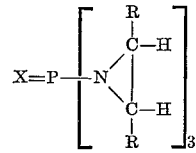

wherein R is, independently in each case, hydrogen or an alkyl, cycloalkyl, aryl, alkaryl, or arylalkyl group containing from 1 to 20 carbon atoms, and X is oxygen or sulfur, and from about 80 to 94 percent by weight of a resinous interpolymer comprising, in combined form, polymer basis:
  (1) from about 13 to 45 weight percent of a beta-hydroxyalkyl acrylate wherein alkyl contains 2–4 carbon atoms,
  (2) from about 15 to 45 weight percent of vinylidene chloride or vinyl chloride, and
  (3) from about 20 to 65 weight percent of styrene.

2. The composition of claim 1 wherein the beta-hydroxyalkyl acrylate is beta-hydroxyethyl acrylate.

3. The composition of claim 1 wherein the tris-(aziridinyl)phosphine oxide is tris(1-aziridinyl)phosphine oxide.

4. The composition of claim 1 wherein the resinous interpolymer contains from about 15 to 45 weight percent vinylidene chloride.

5. The composition of claim 1 wherein the beta-hydroxyalkyl acrylate is beta-hydroxyethyl acrylate, the tris-(aziridinyl)phosphine oxide is tris(1-aziridinyl)phosphine oxide, and the resinous interpolymer contains from about 15 to 45 weight percent vinylidene chloride.

6. The composition of claim 1 wherein the resinous interpolymer additionaly contains from about 12 to 20 weight percent, polymer basis, acrylonitrile.

7. A thermoset composition prepared by curing the composition of claim 1 at a temperature of from about 275° F. to 360° F., for a time of from about 15 to 60 minutes, and at a pressure of from about 10 p.s.i.g. to 100 p.s.i.g.

References Cited

UNITED STATES PATENTS 3,074,917   1/1963   Reynolds _____ 260—85.1
3,198,770   8/1965   Watkins _____ 260—77.5
3,262,919   7/1966   Bolgiano _____ 260—80.75

JOSEPH L. SCHOFER, Primary Examiner

S. M. LEVIN, Assistant Examiner

U.S. Cl. X.R.

117—124, 126, 155; 161—203; 260—78.5, 80.75, 87.5, 87.7